UNITED STATES PATENT OFFICE.

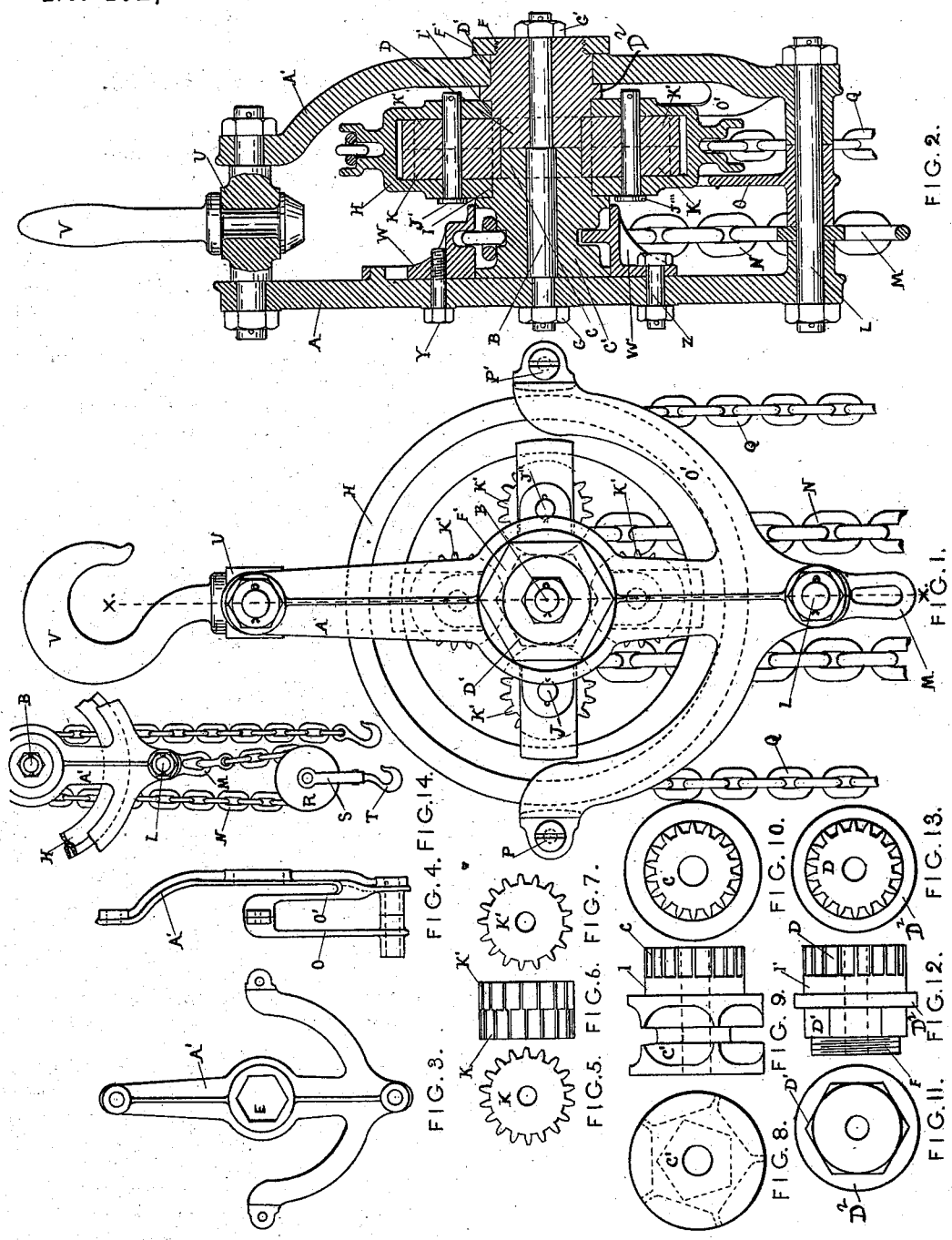

RICHARD LAVERY, OF BOSTON, MASSACHUSETTS.

DIFFERENTIAL GEARING FOR HOISTING-MACHINES.

SPECIFICATION forming part of Letters Patent No. 402,601, dated May 7, 1889.

Application filed December 27, 1887. Serial No. 259,176. (No model.)

*To all whom it may concern:*

Be it known that I, RICHARD LAVERY, a citizen of the United States, residing at Boston, in the county of Suffolk and State of Massachusetts, have invented a new and useful Improvement in Differential Gearing for Hoisting and other Purposes, of which the following is a specification.

This invention relates to that class of gearing described in United States Patents No. 281,195, July 10, 1883, No. 286,206, October 9, 1883, and No. 298,697, May 13, 1884, heretofore granted to me, the object of my invention being to so improve the operative parts of the apparatus as to gain greater strength and safety in sustaining the load, increase the lifting-power, and gain a more equal balancing of the apparatus, the parts being so constructed as to be easily accessible for repairs, and so that parts may be readily changed and renewed when worn or broken.

In this my present invention the two central gears with which the differential pinions engage are supported between the side frames of the apparatus upon a rod or bolt connecting the said side frames, each of the said central gears being shown as provided with bearings upon which runs the operating-wheel carrying the differential pinions; and I have shown, to lessen the number of parts, the lifting-sheave as integral with one of the said central gears, one of the said central gears being rotatable, while the other is shown as fixed with relation to the frame.

In my patent No. 281,195 the operating-wheel and the differential gear were supported outside the frame, and in my Patent No. 286,206 the operating-wheel was mounted upon the shaft surrounded by the central gears.

By constructing the parts as provided for in this present invention the operative strain and wear upon the apparatus are reduced to the minimum and the parts are materially simplified.

My invention in differential-gear apparatus consists, essentially, in a frame having a central rod to hold it together, two center gears surrounding the said rod, one of the said gears being fixed and the other movable, two bearing portions at the sides of the said gears, combined with a lifting-sheave rotated by one of the said gears, and an operating-wheel rotating upon the said bearings and having a series of differential gears free to rotate upon shafts carried by the said operating-wheel, the said differential gears engaging, respectively, the center gears referred to, to operate as will be described.

Other features of my invention will be hereinafter described, and pointed out in the claims.

Figure 1 is a side elevation of a hoisting apparatus embodying my invention; Fig. 2, a vertical section in the line $xx$, Fig. 1. Fig. 3 is a side view of a portion of the frame or housing and half of the guide for the endless chain. Fig. 4 is an end view of Fig. 3, showing the entire chain-guide. Figs. 5 and 6 are respectively end and edge views of one of the differential gear or gears having two lines of teeth differing in number, one at each end, Fig. 5 showing that end of the differential gear containing the greater number of teeth. Fig. 7 shows the end of the differential gears containing the less number of teeth. Fig. 8 is an end view of the lifting-sheave. Fig. 9 is an elevation of the said lifting-sheave with one of the central gears. Fig. 10 is an end view of the said gear, showing the lifting-sheave beyond it. Fig. 11 is an end view of the combined flange, shank, and gear. Fig. 12 is a side view thereof; Fig. 13, a view of Fig. 12 from the right; and Fig. 14 shows part of the apparatus with the chain attached, the latter supporting a tackle-block.

Referring to the drawings, A A' represent the framing or housing of my improved portable hoisting apparatus, the framing being connected at its center by a strong rod, as B, and at its lower part by a bolt, as L.

The rod B supports the central gears, C D, each having an attached bearing portion, as I I', upon which rests and rotates the operating-wheel H, having a series of shafts or studs, as J J', which receive upon them, between the sides of the operating-wheel, a series of differential gears.

Each differential gear consists, essentially, of a gear substantially as shown in Fig. 6, it having at one end a series of teeth, as K, and at its opposite end a series of teeth, as K', the two series of teeth differing in number, and, as herein shown, the series of teeth in the portion K' are less in number than in the portion K.

The teeth of the gears C D are of equal number, and the said gears are substantially end to end.

The gear D, having the bearing portion I', is shown as provided with an extended shank, D', threaded at F, there being a flange, as D², between the bearing portion and the shank-extension D'. The shank-extension D' is extended as far as the flange D² will permit through a suitable hole in the said frame A', and the screw-threaded portion F has applied to it a nut, F', (see Fig. 2,) thus fixing the gear D and bearing I' with relation to the frame.

The gear C, in order to lessen the number of parts, may, and preferably will, be made integral with the lifting-sheave C', the latter, together with gear C, being loose on the rod B, said rod being extended through the gear D and its shank-extension.

The periphery of the operating-wheel is toothed in usual manner for the engagement with it of a chain, as Q, and the lifting-sheave is correspondingly shaped for the reception of a chain, N, the chain N being kept seated in the groove of the lifting-sheave by a hood, W, secured to the side frame A by a screw, Y, the said side frame A having also secured to it by a bolt, as Z, a block-piece, W', which serves to unseat the chain N from the lifting-sheave.

The side frame A', as shown best in Fig. 4, has secured to it in suitable manner a chain-guide, O O', (see, also, Fig. 3,) the said guide preventing the chain Q from being removed laterally from the operating-wheel by reason of any side strain on the chain.

The bolt L has connected to and depending from it a link, as M, into which may be connected (when it is desired to double the lifting-power of the apparatus) one end of the chain N, a bight of the chain between the said link and the lifting-sheave at such time receiving the sheave R of a tackle and block, S T, of usual construction. The lifting-chain N is shown with two hooks, either of which can be used in moving the load.

The upper end of the frame is joined by a cross-head, u, in which is swiveled a hook, V.

The screws P P' confine together the opposite ends of the guides O O'.

I have herein shown a series of four differential gears; but I do not desire to limit my invention to any particular number of differential gears, as their number will depend upon the character of the work to be done and the load to be carried by the apparatus.

It will be noticed, viewing Fig. 3, that the hole in the frame A' is enlarged to a diameter considerably beyond that of the rod B, and, as shown, the hole is many-sided or hexagonal, to receive the correspondingly-shaped extension or shank D', connected to or forming part of the gear D and bearing I', the flange D² next the extension or shank D' taking a bearing against the inner side of the frame A', the nut F preventing longitudinal movement of the shank with relation to the frame, yet permitting the shank D' to be readily removed, together with the gear D, rod B, and all the parts carried by it through the frame A'.

Viewing Fig. 1, it will be noticed that that portion of the rod B which is surrounded by the movable gear C and the lifting-sheave is of greater diameter than the part of the said rod which is extended through the gear D and shank D', a shoulder being left on the rod where the faces of the two gears C D meet.

The rod B is held in position by means of the nuts G G'.

The rod B referred to has two shoulders, one of which rests against the inner face of the side frame A, while the outer shoulder (see Fig. 2) rests against the end of the gear D, the said two shoulders thus acting to keep the two side frames from coming together. The flange D² of the gear D bears directly against the inner side of the side frame A'.

The operation is as follows: By hauling upon the hand operating-chain Q a rotary motion is imparted to the hollow wheel or drum H, carrying the series of differential pinions K K' K K', &c., having their axes on the shafts J J' J² J³, and the said gears, carried by the arms or sides of the hollow wheel or drum H, are made to roll upon, and by their opposite ends engaging, respectively, the peripheries of the movable and fixed gears C D; and as the gear D is fixed and is engaged by a pinion, as K', having a different number of teeth, and because the teeth of the pinion K, engaging the teeth of the gear C, also differ in number from those of the pinion K', a slow movement of rotation is obtained for the lifting-sheave to hoist the load. When an increase of power is desired, by passing one end of the load-chain N through the tackle-block S and hooking one of the hooks to the link M, held by the bolt L at the bottom of the frames A A', the load being transferred to the swivel-hook T; double the power to move the load is obtained.

The load-chain N is provided with two hooks, either of which can be used to raise the load by reversing the motion.

I claim—

1. In a differential-gear apparatus for hoisting, a frame, a central rod, as B, the central gear, C, provided with a bearing, I, and lifting-sheave C', mounted loosely on said rod, the central gear, D, provided with bearing I', flange D², and shank D', combined with an operating-wheel rotating upon the said bearings, and a series of differential gears, as K K', free to revolve upon shafts, as J J', engaging, respectively, the central gears, C D, to operate substantially as described.

2. The frame A A', the rod B, the central gear, D, provided with a bearing, I', a flange, D², a shank, D', and a screw, F, and a nut, F', to secure the shank to the said frame, combined with the central rotating gear, C, bearing I, lifting-sheave C', permanently connected integral with the said gear and bearing and free to rotate upon the said rod, the operating-wheel H, mounted upon the said bearings, a series of shafts, as J, therein, and a series of differential gears, as K K', on the said shafts J, the opposite ends of each gear engaging the said central gears, C D, to operate substantially as described.

3. In a differential-gear hoisting apparatus, the frame or housing A', provided with a hole, as E, through it centrally, in combination with the gear D, provided with a bearing, I', a flange, D², and a shank, D', to fit the said hole E, a screw, F, and nut F', whereby the said gear is made a fixture with the frame or housing A', and a rod, B, enlarged and provided with screws and nuts G G', as and for the purpose specified.

4. In a differential-gear hoisting apparatus, the frame A A', rod B, and the central externally-toothed gear, C, provided with bearing I and lifting-sheave C', both integral mounted and free to revolve upon the said rod B, the frame A', and central externally-toothed gear, D, provided with bearing I', flange D², shank D', and screw F, together with the nut F', whereby the said frame and gear are held together and the gear made non-revolving, in combination with the hollow annular operating-wheel H, provided with differential pinions K K', and shafts J J', the said operating-wheel being mounted and free to revolve upon the aforesaid bearings I I', as and for the purpose shown and specified.

5. The frame or housing A A', in combination with the fixed central gear, D, having the bearing I', flange D², and shank D', provided with screw F, the nut F', hollow annular operating-wheel H, differential pinions K K', shafts J J', revolving central gear, C, and bearing I, both integral with lifting-sheave C', frame or housing A, center rod, B, provided with nuts G G', seating and unseating device W W', lifting-chain N, bolt and link L M, sheave-wheel R, tackle-block and swivel-hook S T, cross-head and swivel-hook U V, hand operating-chain Q, and guide O O', as and for the purpose shown and specified.

6. In a differential-gear hoisting apparatus, the frame A A' and central rod, B, and a series of pairs of differential external toothed pinions made integral, one gear of each pair having a less number of teeth than the other, in combination with two central gears, one of which is integral with the lifting-sheave and is adapted to revolve upon the said central rod, the other being fixed, and a hollow annular operating-wheel mounted and free to revolve upon bearings integral with the aforesaid central gears, the series of differential pinions being mounted and free to revolve upon shafts passing through and supported by the sides or arms of the hollow annular operating-wheel and gearing simultaneously into the revolving and fixed central gears aforesaid, as and for the purpose specified.

7. In differential-gearing apparatus for hoisting, the side frames and operating-wheel, combined with a guide for the endless chain, the said guide being composed of two members, O O', one of which is integral with one side of the frame or housing of the machine, while the other member is secured to the first member, and also to the frame or housing aforesaid, the guide being in the form of two segments of a circular flange joined together at their extremities and standing apart sufficiently to admit between them the said operating-wheel, having pockets upon its periphery, into which fits an endless chain, the guide inclosing the rim of one-half of the said operating-wheel, substantially as shown and described.

In testimony whereof I have signed my name to this specification in the presence of two subscribing witnesses.

RICHARD LAVERY.

Witnesses:
L. W. HOWES,
E. PLANTA.